United States Patent Office 3,210,355
Patented Oct. 5, 1965

3,210,355
PYRIMIDINONES AND PROCESS OF
PREPARING SAME
George de Stevens, Summit, N.J., assignor to Ciba Corporation, New York, N.Y., a corporation of Delaware
No Drawing. Filed Mar. 6, 1963, Ser. No. 263,125
8 Claims. (Cl. 260—251)

The present invention concerns a new procedure for the manufacture of substituted pyrimidine compounds, particularly of 1-R-2-$R_a$-5-$R_c$-6-$R_b$-4-X-1,4 - dihydro - pyrimidine compounds, in which each of the groups R and $R_a$ is an organic radical, and each of the groups $R_b$ and $R_c$ is an organic radical or, when taken together, a bivalent organic radical, and in which X is oxo or thiono, as well as salts of such compounds. More especially, the novel method of this invention is particularly suitable for the preparation of compounds of the formula

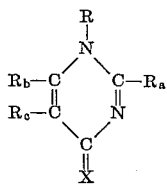

in which X has the previously given meaning, each of the groups R and $R_a$ is an organic radical, particularly an aliphatic radical or an aryl radical, $R_b$ is an organic radical, especially an aliphatic radical, an aryl radical, or, when taken together with $R_c$, a bivalent organic radical, particularly a bivalent aliphatic radical, and $R_c$ is an organic radical, especially a functionally converted carboxyl group, an acyl group, an aliphatic radical or an aryl radical, or, when taken together with $R_b$, a bivalent organic radical, above all a bivalent aliphatic radical, and the salts of these compounds.

An aliphatic radical representing the groups R, $R_a$, $R_b$ and $R_c$ is primarily a lower aliphatic radical, especially lower alkyl, e.g., methyl, ethyl, n-propyl, isopropyl, n-butyl, isobutyl and the like, as well as lower alkenyl, e.g., allyl and the like. An aliphatic radical may also be a substituted aliphatic radical, such as a carbocyclic aryl-lower aliphatic radical, for example, phenyl-lower alkyl, e.g., benzyl, 2-phenylethyl and the like, or substituted phenyl-lower alkyl, in which phenyl has one or more than one of the same or of different substituents attached to any position available for substitution, such as lower alkyl, e.g., methyl, ethyl, n-propyl, isopropyl and the like, lower alkoxy, e.g., methoxy, ethoxy n-propyloxy and the like, halogeno, e.g., fluoro, chloro, bromo and the like, nitro, amino, N-lower alkyl-amino, e.g., N-methyl-amino, N-ethyl-amino and the like, N,N-di-lower alkyl-amino, e.g., N,N-dimethylamino, N,N-diethylamino and the like, or any other suitable substituent, as well as a cycloaliphatic radical, such as cycloalkyl having from three to eight, preferably from five to seven, ring carbon atoms, e.g., cyclopropyl, cyclopentyl, cyclohexyl, cycloheptyl and the like, a cycloaliphatic-aliphatic radical, such as cycloalkyl-lower alkyl, in which cycloalkyl has from three to eight, preferably from five to seven, ring carbon atoms, e.g., cyclopropylmethyl, cyclopentylmethyl, 2-cyclopentylethyl, cyclohexylmethyl, 1-cyclohexylethyl, cycloheptylmethyl and the like, or any other suitable aliphatic radical.

An aryl group representing $R_1$, $R_a$, $R_b$ and $R_c$ is primarily a carbocyclic aryl group, particularly monocyclic carbocyclic aryl, i.e., phenyl or substituted phenyl, as well as bicyclic carbocyclic aryl, i.e., naphthyl or substituted naphthyl. Substituted phenyl and substituted naphthyl radicals contain one or more than one of the same or of different substituents attached to any position available for substitution; substituents are, for example, lower alkyl, e.g., methyl, ethyl, n-propyl, isopropyl and the like, lower alkoxy, e.g., methoxy, ethoxy n-propyloxy and the like, halogeno, e.g., fluoro, chloro, bromo and the like, nitro, amino, N-lower alkyl-amino, e.g., N-methyl-amino, N-ethyl-amino and the like, N,N-di-lower alkyl-amino, e.g., N,N-dimethylamino, N,N-diethylamino and the like, or any other suitable substituent.

An aryl group representing R, $R_a$, $R_b$ and $R_c$ may also be a heterocyclic aryl group, especially a monocyclic heterocyclic radical, such as a monocyclic azacyclic radical, for example, pyridyl, e.g., 2-pyridyl, 3-pyridyl or 4-pyridyl, as well as pyridazinyl, e.g., 3-pyridazinyl or 4-pyridazinyl, pyrimidyl, e.g., 2-pyrimidyl, 4-pyrimidyl or 5-pyrimidyl, pyrazinyl, e.g., 2-pyrazinyl, as well as monocyclic oxacyclic aryl, such as furyl, e.g., 2-furyl and the like, or monocyclic thiacyclic aryl, such as thienyl, e.g., 2-thienyl and the like. Other heterocyclic aryl radicals are, for example, bicyclic heterocyclic aryl radicals, such as bicyclic azacyclic aryl radicals, for example, quinolinyl, e.g., 2-quinolinyl, 4-quinolinyl and the like, isoquinolinyl, e.g., 1-isoquinolinyl and the like, or other analogous bicyclic heterocyclic aryl radicals.

As mentioned before, the groups $R_b$ and $R_c$ may be taken together and form a bivalent aliphatic radical. Such radical has preferably from three to seven carbon atoms, and represents primarily an alkylene radical having from three to seven carbon atoms, e.g., 1,3-propylene, 1,4-butylene, 1-methyl - 1,4 - butylene, 2,2-dimethyl-1,4-butylene, 1,5-pentylene and the like, as well as alkenylene having from three to five carbon atoms, or a substituted bivalent aliphatic radical, such as an oxo-alkylene radical having from three to seven carbon atoms, e.g., 1-oxo-1,3-propylene, 1-oxo - 1,4 - butylene, 2,2-dimethyl-1-oxo-1,4-butylene and the like, or any other suitable bivalent aliphatic radical.

A functionally converted carboxyl group representing $R_c$ is primarily esterified carboxyl, particularly carbalkoxy, such as carbo-lower alkoxy, e.g., carbomethoxy, carbethoxy, carbo-n-propoxy, carbo-isopropoxy, carbo-n-butyloxy and the like, or any other esterified carboxyl group, as well as cyano or carbamyl, such as N-unsubstituted carbamyl, N-monosubstituted carbamyl, for example, N-lower alkyl-carbamyl, e.g., N-methyl-carbamyl, N-ethyl-carbamyl and the like, or N,N-disubstituted carbamyl, such as N,N-di-lower alkyl-carbamyl, e.g., N,N-dimethyl-carbamyl, N,N-diethyl-carbamyl and the like.

An acyl group representing $R_c$ is formyl or an aliphatic substituted carbonyl group, such as lower alkanoyl, e.g., acetyl, propionyl, isobutyryl, pivalyl and the like, as well as an aryl substituted carbonyl group, such as carbocyclic aryl-carbonyl, e.g., benzoyl and the like, or heterocyclic aryl-carbonyl, such as pyridoyl, e.g., nicotinoyl and the like.

The compounds prepared according to the procedure of the present invention have valuable properties and can be used per se or as intermediates for the preparation of other compounds. For example, they absorb ultraviolet light of wave-lengths between 300 m$\mu$ and 350 m$\mu$, and can, therefore, be used as the active sun screen agent in topical preparations for the prevention of sunburns. They may be made up into such compositions according to customary methods; preferably they are incorporated into a hydrophilic ointment which contains inter alia glycols, e.g., propylene glycol and the like, higher aliphatic alcohols, e.g., stearyl alcohol and the like, white petrolatum, water or any other inert ingredients used in sun screen preparation. The latter have from about three to about five percent of the ultraviolet light absorbent. Furthermore, the compounds prepared according to the process of the invention have the pharmacological properties, such as sedative and tranquilizing effects, and can, therefore, be used as sedative and tranquilizing agents to counteract nervousness, agitation or overstimulation; they also show antibacterial properties and can be used to combat bacterial infections, and represent versatile intermediates for the preparation of other compounds useful as pharmaceuticals, dyestuffs and the like.

The novel one-step procedure for the preparation of the above compounds comprises reacting a 1-(N—R-amino)-1-$R_b$-2-$R_c$-ethene compound, in which R, $R_b$ and $R_c$ have the previously-given meaning, particularly an enamine compound of the formula

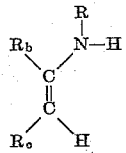

in which R, $R_b$ and $R_c$ have the previously given meaning, or the imino-tautomer thereof, with an

N—($R_a$—CO)-isocyanate or an N—($R_a$—CO)-isothiocyanate, in which $R_a$ has the previously given meaning, particularly with a compound of the formula

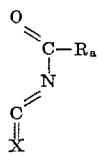

in which X and $R_a$ have the previously given meaning, and, if desired, converting a resulting salt into the free compound or into another salt, and/or, if desired, converting a resulting compound into a salt thereof, and/or, if desired, converting in a resulting compound a functional group into another functional group.

Preferably the process of this invention is carried out by mixing the two reagents, advantageously in the presence of a neutral diluent, e.g., tetrahydrofuran, p-dioxane, dimethoxyethane, diethyleneglycol dimethylether, diethyl ether, chloroform, toluene and the like; if necessary, these diluents have to be dried before use. Usually, the reaction is performed at an elevated temperature, preferably by heating to from about 50° C. to about 120° C. If necessary, it may have to be carried out in a closed vessel and/or in the atmosphere of an inert gas, e.g., nitrogen.

The preferred enamine compounds used as the starting materials have the following formula

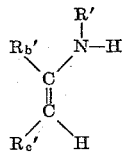

in which R' is lower alkyl, or monocyclic carbocyclic aryl, particularly phenyl, as well as (lower alkyl)-phenyl, (lower alkoxy)-phenyl, (halogeno)-phenyl, (nitro)-phenyl, (N,N-di-lower alkyl-amino)-phenyl and the like, $R_b'$ is lower alkyl, monocyclic carbocyclic aryl, particularly phenyl, as well as (lower alkyl)-phenyl, (lower alkoxy)-phenyl, (halogeno)-phenyl, (nitro)-phenyl, (N,N-di-lower alkyl-amino)-phenyl and the like, or, when taken together with $R_c'$, an alkylene radical having from three to seven carbon atoms, especially a 1,3-propylene radical, or a 1,4-butylene radical, or an oxo-alkylene radical having from three to seven carbon atoms, particularly a 1-oxo-1,3-propylene radical or a 1-oxo-1,4-butylene radical, and $R_c'$ is carbo-lower alkoxy, cyano, lower alkanoyl, or, when taken together with $R_b'$, an alkylene radical having from three to seven carbon atoms, or an oxo-alkylene radical having from three to seven carbon atoms. These starting materials are prepared according to known methods, for example, by treating a 1-$R_b$-2-$R_c$-1-oxo-ethane compound, in which $R_b$ and $R_c$ have the previously given meaning, particularly a compound of the formula

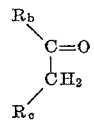

in which $R_b$ and $R_c$ have the previously given meaning, with an N-monosubstituted amine, particularly a compound of the formula R—$NH_2$, in which R has the previously given meaning, and, if necessary, removing water, for example, by azeotropic distillation.

The preferred isocyanate and isothiocyanate compounds used in the new method of this invention are compounds of the formula

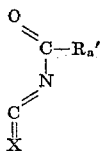

in which X has the previously given meaning, and $R_a'$ is lower alkyl or monocyclic carbocyclic aryl, especially phenyl, as well as (lower alkyl)-phenyl, (lower alkoxy)-phenyl, (halogeno)-phenyl, (nitro)-phenyl, (N,N-di-lower alkyl-amino)-phenyl and the like. These starting materials are prepared, for example, by reacting silver nitrate with an alkali metal, e.g., potassium and the like, isocyanate or isothiocyanate in the presence of diethylether, and adding the slurry of the resulting silver isocyanate or silver isothiocyanate to a diethylether solution of an acyl halide, particularly of the formula $R_a$—CO—Hal, in which Hal is halogeno, e.g., chloro, bromo and the like; the resulting precipitate is filtered off, the filtrate is evaporated and, if necessary, the desired isocyanate or isothiocyanate compound is purified, for example, by distillation.

An acid addition salt resulting from the procedure of this invention may be converted into the free compound, for example, by treating it with a base, such as a metal hydroxide, e.g., sodium hydroxide, potassium hydroxide, calcium hydroxide and the like, a metal carbonate, e.g., sodium, potassium or calcium carbonate or hydrogen carbonate and the like, ammonia and the like, or with a hydroxyl ion exchange preparation or any other suitable reagent.

A resulting acid addition salt may also be converted into another acid addition salt; for example, a salt with an inorganic acid may be reacted with a metal, e.g., sodium, barium, silver and the like, salt of an acid in the presence of a diluent, in which a resulting inorganic compound is insoluble and is thus removed from the reaction, or an acid addition salt may be reacted with an anion exchange preparation.

A free compound may be converted into an acid addition salt thereof, for example, by reacting it with an acid, preferably in the presence of a suitable solvent or solvent mixture. Suitable acids are, for example, inorganic acids, e.g., hydrochloric, hydrobromic, nitric, sulfuric, phosphoric acids and the like, or organic acids, such as organic carboxylic acids, e.g., acetic, propionic, glycolic, oxalic, malonic, succinic, maleic, hydroxymaleic, fumaric, malic, tartaric, citric, benzoic, salicylic, 4-aminosalicylic, 2-phenoxybenzoic, nicotinic, isonicotinic acid, or an organic sulfonic acid, e.g., methane sulfonic, ethane sulfonic, 2-hydroxyethane sulfonic, benzene sulfonic, toluene sulfonic, 2-naphthalene sulfonic acid. Salts which may be formed for identification purposes are, for example, those with acidic organic nitro compounds, e.g., picric, picrolonic, flavianic acid and the like, or with metal complex acids, e.g., phosphotungstic, phosphomolybdic, chloroplatinic Reinecke acid and the like. A free compound may also be converted into an acid addition salt by treatment with a suitable anion exchange preparation and isolating the desired salt.

In a resulting compound, a functional group may be converted into another functional group. For example, an esterified carboxyl group may be converted into a free carboxyl group, for example, by hydrolysis using an aqueous or alcoholic alkaline reagent, such as an alkali metal hydroxide or an alkaline earth metal hydroxide, e.g., sodium hydroxide, potassium hydroxide and the like.

An esterified carboxyl group in a resulting compound may also be converted into another esterified carboxyl group by transesterification using an alcohol in the presence of a suitable transesterification reagent, such as an alkali metal alcoholate, an alkaline earth metal alcoholate, an aluminum alcoholate, potassium cyanide, benzyl trimethyl ammonium hydroxide, tungstic acid, p-toluene sulfonic acid and the like. Conversion of an esterified carboxyl group into another esterified carboxyl group may also be carried out in steps; it may first be converted into the free carboxyl group (by hydrolysis as previously-described) and the latter may be reesterified according to known methods, for example, by treatment with an alcohol in the presence of a suitable acid, a diazo-compound and the like.

Also included within the scope of this invention are the new compounds having the following formula

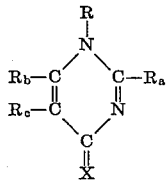

in which X, R, $R_a$, $R_b$ and $R_c$ have the previously given meaning, and the salts thereof, especially the compounds of the formula

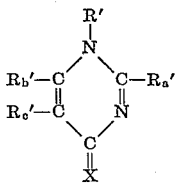

in which each of the groups R' and $R_a$ is lower alkyl or monocyclic carbocyclic aryl, such as phenyl, (lower alkyl)-phenyl, (lower alkoxy)-phenyl, (halogeno)-phenyl, (nitro)-phenyl, (N,N-di-lower alkyl-amino)-phenyl and the like, the group $R_b'$ is lower alkyl, monocyclic carbocyclic aryl, such as phenyl, (lower alkyl)-phenyl, (lower alkoxy)-phenyl, (halogeno)-phenyl, (nitro)-phenyl, (N,N-di-lower alkyl-amino)-phenyl and the like, or, when taken together with $R_c'$, an alkylene radical having from three to seven carbon atoms or an oxo-alkylene radical having from three to seven carbon atoms, and $R_c'$ is carbo-lower alkoxy, cyano, lower alkanoyl, or when taken together with $R_b'$, an alkylene radical having from three to seven carbon atoms or an oxo-alkylene radical having from three to seven carbon atoms, or the acid addition salts thereof, particularly those with the above acids.

The invention also comprises any modification of the process wherein a compound obtainable as an intermediate at any stage of the process is used as starting material and the remaining step(s) of the process is (are) carried out, as well as any new intermediates.

In the process of the invention, those starting materials are preferably used which lead to final products mentioned before as preferred embodiments of the invention.

The following examples are intended to illustrate the invention and are not to be construed as being limitations thereon. Temperatures are given in degrees centigrade.

Example 1

A mixture of 5.0 g. of ethyl 3-(N-phenyl-amino)-crotonate and 5.0 g. of N-(3-nitrobenzoyl)-isothiocyanate in 50 ml. of tetrahydrofuran is refluxed for four hours. The solvent is evaporated, the residue is taken up in a small amount of ethanol, and the crystalline 5-carbethoxy-6-methyl-1-phenyl-2-(3-nitro-phenyl)-4-thiono-1,4-dihydro-pyrimidine of the formula

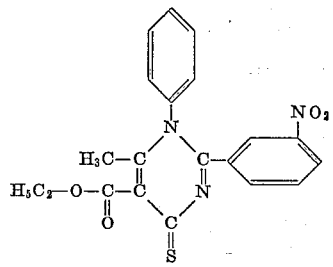

is filtered off and recrystallized from ethanol, M.P. 240°; yield: 2.5 g. The ultraviolet absorption spectrum shows an absorption band $\lambda_{max.}$ at 341–344 m$\mu$.

Example 2

A mixture of 10.0 g. of ethyl 3-(N-phenyl-amino)-crotonate and 11.0 g. of N-(4-bromo-benzoyl)-isothiocyanate in 100 ml. of tetrahydrofuran is refluxed for four hours. The solvent is evaporated, the residue is treated with a small amount of ethanol, and the crystalline 2-(4-bromo-phenyl)-5-carbethoxy-6-methyl-1-phenyl-4-thiono-1,4-dihydro-pyrimidine of the formula

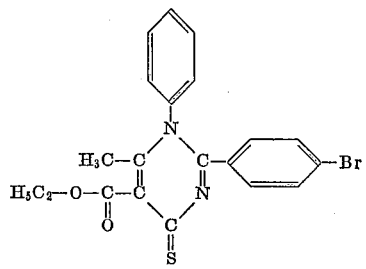

is filtered off and recrystallized three times from ethanol, M.P. 200°; yield: 11.5 g. The ultraviolet absorption spectrum shows an absorption band $\lambda_{max.}$ at 341–344 m$\mu$.

Example 3

A mixture of 10.0 g. of ethyl 3-(N-phenyl-amino)-crotonate and 6.6 g. of N-benzoyl-isothiocyanate in 50 ml. of tetrahydrofuran is refluxed for four hours. The solvent is stripped off and the residue is treated with ethanol. The resulting crystalline 5-carbethoxy-1,2-diphenyl-6-methyl-4-thiono-1,4-di-hydro-pyrimidine of the formula

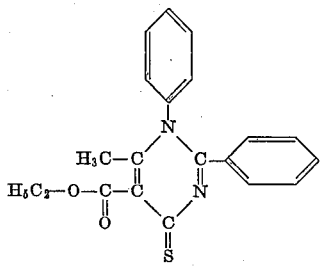

is filtered off and recrystallized from ethanol, M.P. 215°; the ultraviolet absorption spectrum shows absorption bands $\lambda_{max.}$ at 246–247 m$\mu$ and 341–344 m$\mu$. Other compounds which may be prepared according to the above procedure by selecting the appropriate starting materials are, for example, 5-carbomethoxy-1,6-dimethyl-2-(2-methyl-phenyl)-4-thiono-1,4-dihydro-pyrimidine, 5-carbo-n-propoxy-2,6-dimethyl-1-(4-fluoro-phenyl)-4-thiono-1,4-dihydro-pyrimidine,
5-acetyl-2,6-diphenyl-1-isopropyl-4-thiono-1,4-dihydro-pyrimidine,
5,6-dimethyl-2-(4-methoxy-phenyl)-1-(2-pyridyl)-4-thiono-1,4-dihydro-pyrimidine,
5-carbethoxy-1,2-diphenyl-6-methyl-4-oxo-1,4-dihydro-pyrimidine,
1,2-diphenyl-4-oxo-1,4,5,6,7,8-hexahydro-quinazoline,
2-(4-N,N-dimethylamino-phenyl)-1-methyl-4,6-dioxo-1,4,5,6,7,8-hexahydro-quinazoline and the like.

What is claimed is:

1. Process for the preparation of a compound having the following formula

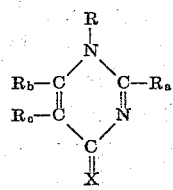

in which each of the groups R and $R_a$ is a member selected from the group consisting of an aliphatic radical and an aryl radical, $R_b$ is a member selected from the group consisting of an aliphatic radical, an aryl radical and, when taken together with $R_c$, a bivalent aliphatic radical, and $R_c$ is a member selected from the group consisting of carbo-lower alkoxy, cyano, carbamyl, a carboxylic acid acyl group, an aliphatic radical, and, when taken together with $R_b$, a bivalent aliphatic radical, which comprises reacting a member selected from the group consisting of a compound of the formula

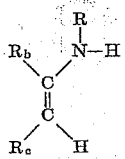

in which R, $R_b$ and $R_c$ have the previously-given meaning, and the imino-tautomer thereof, with a compound of the formula

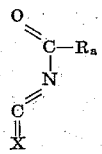

in which $R_a$ and X is a member selected from the group consisting of oxo and thiono.

2. Process according to claim 1, which comprises reacting the two starting materials in the presence of a neutral diluent.

3. Process according to claim 1, which comprises carrying out the reaction at an elevated temperature.

4. Process according to claim 1, which comprises reacting a member selected from the group consisting of a compound of the formula

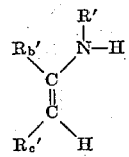

in which R' is a member selected from the group consisting of lower alkyl and monocyclic carbocyclic aryl, $R_b'$ is a member selected from the group consisting of lower alkyl, monocyclic carbocyclic aryl, and when taken together with $R_c'$, alkylene having from three to seven carbon atoms, and oxo-alkylene having from three to seven carbon atoms, and $R_c'$ is a member selected from the group consisting of carbo-lower alkoxy, cyano, lower alkanoyl and, when taken together with $R_b'$, alkylene having from three to seven carbon atoms, and oxo-alkylene having from three to seven carbon atoms, and the imino-tautomer thereof, with a compound of the formula

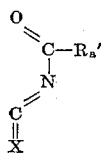

in which X is a member selected from the group consisting of oxo and thiono, and $R_a'$ is a member selected from the group consisting of lower alkyl and monocyclic carbocyclic aryl.

5. A member selected from the group consisting of a compound of the formula

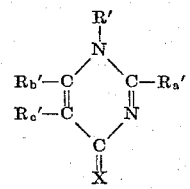

in which R' is a member selected from the group consisting of lower alkyl, phenyl, (lower alkyl)-phenyl, (lower alkoxy)-phenyl, (halogeno)-phenyl, (nitro)-phenyl, and (N,N-di-lower alkyl-amino)-phenyl, $R_a'$ is a member selected from the group consisting of lower alkyl, phenyl, (lower alkyl)-phenyl, (lower alkoxy)-phenyl, (halogeno)-phenyl, (nitro)-phenyl, and (N,N-di-lower alkyl-amino)-phenyl, $R_b'$ is a member selected from the group consisting of lower alkyl, phenyl, (lower alkyl)-phenyl, (lower alkoxy)-phenyl, (halogeno)-phenyl, (nitro)-phenyl, (N,N-di-lower alkyl-amino)-phenyl, and, when taken together with $R_c'$, alkylene having from three to seven carbon atoms, and oxo-alkylene having from three to seven carbon atoms, $R_c'$ is a member selected from the group consisting of carbo-lower alkoxy, cyano, lower alkanoyl and, when taken together with $R_b'$, alkylene having from three to seven carbon atoms, and oxo-alkylene having from three to seven carbon atoms, and X is a member selected from the group consisting of oxo and thiono, and an acid addition salt thereof.

6. 5-carbethoxy-6-methyl-1-phenyl-2-(3-nitro-phenyl)-4-thiono-1,4-dihydro-pyrimidine.

7. 2-(4-bromo-phenyl)-5-carbethoxy-6-methyl-1-phenyl-4-thiono-1,4-dihydro-pyrimidine.

8. 5-carbethoxy-1,2-diphenyl-6-methyl-4-thiono-1,4-dihydro-pyrimidine.

No references cited.

NICHOLAS S. RIZZO, *Primary Examiner.*